(12) United States Patent
Guthrie et al.

(10) Patent No.: US 10,649,902 B2
(45) Date of Patent: *May 12, 2020

(54) REDUCING TRANSLATION LATENCY WITHIN A MEMORY MANAGEMENT UNIT USING EXTERNAL CACHING STRUCTURES

(71) Applicant: International Business Machines Corporation, Armonk, NY (US)

(72) Inventors: Guy L. Guthrie, Austin, TX (US); Jody B. Joyner, Austin, TX (US); Ronald N. Kalla, Round Rock, TX (US); Michael S. Siegel, Raleigh, NC (US); Jeffrey A. Stuecheli, Austin, TX (US); Charles D. Wait, Byron, MN (US); Frederick J. Ziegler, Pine Island, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/819,458

(22) Filed: Nov. 21, 2017

(65) Prior Publication Data

US 2019/0065380 A1 Feb. 28, 2019

Related U.S. Application Data

(63) Continuation of application No. 15/682,828, filed on Aug. 22, 2017.

(51) Int. Cl.
*G06F 12/0864* (2016.01)
*G06F 12/1009* (2016.01)
(Continued)

(52) U.S. Cl.
CPC ...... *G06F 12/0864* (2013.01); *G06F 12/0888* (2013.01); *G06F 12/0897* (2013.01);
(Continued)

(58) Field of Classification Search
None
See application file for complete search history.

(56) References Cited

U.S. PATENT DOCUMENTS 6,356,980 B1    3/2002  Arimilli et al.
8,312,220 B2   11/2012  Guthrie et al.
(Continued)

OTHER PUBLICATIONS

Bhattacharjee, *Large-Reach Memory Management Unit Caches*, Proceedings of the 46th Annual IEEE/ACM International Symposium on Microarchitecture (MICRO-46), Dec. 2013, pp. 383-394, ACM New York, NY, USA.
(Continued)

*Primary Examiner* — Charles Rones
*Assistant Examiner* — Ryan Dare
(74) *Attorney, Agent, or Firm* — Nathan M. Rau

(57) ABSTRACT

Reducing translation latency within a memory management unit (MMU) using external caching structures including requesting, by the MMU on a node, page table entry (PTE) data and coherent ownership of the PTE data from a page table in memory; receiving, by the MMU, the PTE data, a source flag, and an indication that the MMU has coherent ownership of the PTE data, wherein the source flag identifies a source location of the PTE data; performing a lateral cast out to a local high-level cache on the node in response to determining that the source flag indicates that the source location of the PTE data is external to the node; and directing at least one subsequent request for the PTE data to the local high-level cache.

7 Claims, 5 Drawing Sheets

(51) Int. Cl.
*G06F 12/0888* (2016.01)
*G06F 12/0897* (2016.01)
*G06F 12/1027* (2016.01)

(52) U.S. Cl.
CPC ...... *G06F 12/1009* (2013.01); *G06F 12/1027* (2013.01); *G06F 2212/1024* (2013.01); *G06F 2212/65* (2013.01); *G06F 2212/682* (2013.01)

(56) References Cited

U.S. PATENT DOCUMENTS

| | | | | |
|---|---|---|---|---|
| 2002/0042863 | A1* | 4/2002 | Jeddeloh | G06F 12/084 711/143 |
| 2004/0049636 | A1* | 3/2004 | Campbell | G06F 12/0866 711/130 |
| 2010/0262782 | A1* | 10/2010 | Guthrie | G06F 12/0811 711/122 |
| 2017/0083240 | A1* | 3/2017 | Rogers | G06F 3/065 |

OTHER PUBLICATIONS

Barr et al., *Translation Caching: Skip, Don't Walk (the Page Table)*, Proceedings of the 37th Annual International Symposium on Computer Architecture (ISCA '10), Jun. 2010, pp. 48-59, ACM New York, NY, USA.

U.S. Appl. No. 15/682,828, To Guy L. Guthrie et al., entitled, *Reducing Translation Latency Within a Memory Management Unit Using External Caching Structures*, assigned to International Business Machines Corporation, 29 pages, filed Aug. 22, 2017.

Appendix P; List of IBM Patent or Applications Treated as Related, Nov. 16, 2017, 2 pages.

* cited by examiner

REDUCING TRANSLATION LATENCY WITHIN A MEMORY MANAGEMENT UNIT USING EXTERNAL CACHING STRUCTURES

CROSS-REFERENCE TO RELATED APPLICATION

This application is a continuation application of U.S. patent application Ser. No. 15/682,828, filed Aug. 22, 2017.

BACKGROUND

Field of the Invention

The field of the invention is data processing, or, more specifically, methods, apparatus, and products for reducing translation latency within a memory management unit using external caching structures.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, systems, and apparatus for reducing translation latency within a memory management unit (MMU) using external caching structures are disclosed in this specification. Reducing translation latency within a MMU using external caching structures includes requesting, by the MMU on a node, page table entry (PTE) data and coherent ownership of the PTE data from a page table in memory; receiving, by the MMU, the PTE data, a source flag, and an indication that the MMU has coherent ownership of the PTE data, wherein the source flag identifies a source location of the PTE data; performing a lateral cast out to a local high-level cache on the node in response to determining that the source flag indicates that the source location of the PTE data is external to the node; and directing at least one subsequent request for the PTE data to the local high-level cache.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
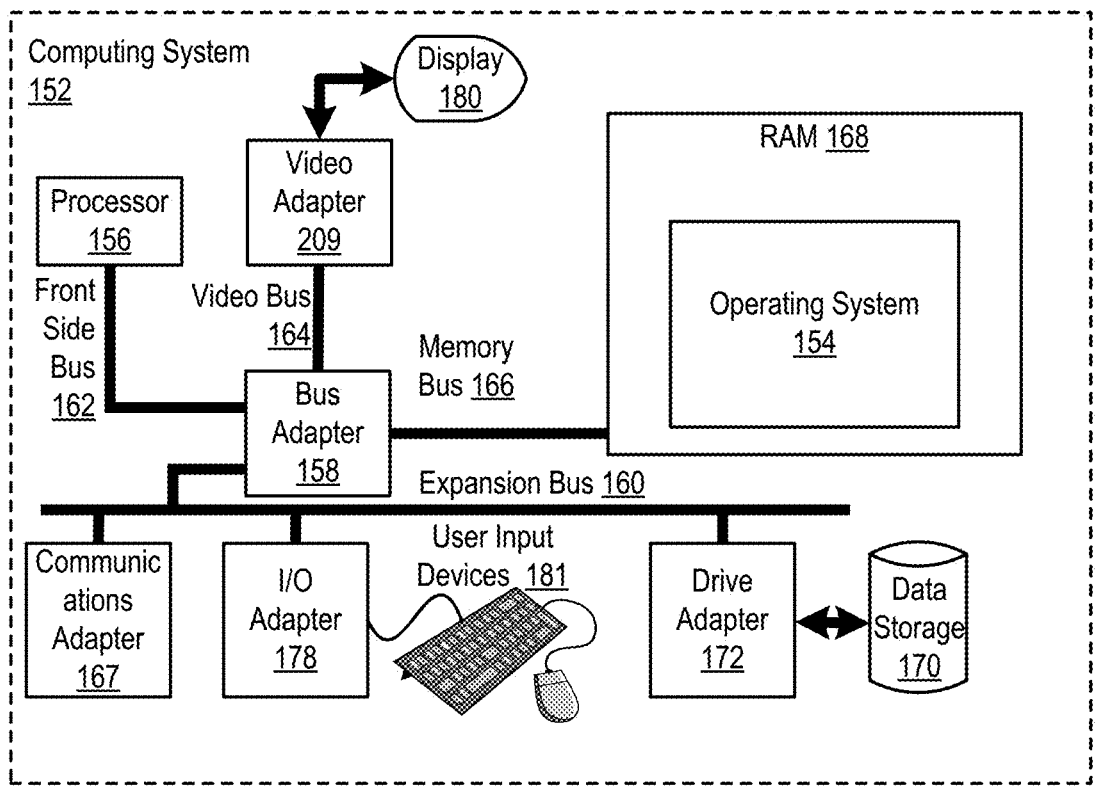
FIG. 1 sets forth a block diagram of an example system configured for reducing translation latency within a memory management unit (MMU) using external caching structures according to embodiments of the present invention.

Exemplary methods, apparatus, and products for reducing translation latency within a MMU using external caching structures in accordance with the present invention are described with reference to the accompanying drawings, beginning with FIG. 1. FIG. 1 sets forth a block diagram of automated computing machinery comprising an exemplary computing system (152) configured for reducing translation latency within a memory management unit (MMU) using external caching structures according to embodiments of the present invention. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

The computer (152) of FIG. 1 includes at least one computer processor (156) or 'CPU' as well as random access memory (168) (RAM') which is connected through a high speed memory bus (166) and bus adapter (158) to processor (156) and to other components of the computer (152). The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets.

Although the processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the processor (156) may be coupled to other components of a computer system in a variety of configurations. For example, the processor (156) in some embodiments may include a memory controller configured for direct coupling to a memory bus (166). In some embodiments, the processor (156) may support direct peripheral connections, such as PCIe connections and the like.

Stored in RAM (168) is an operating system (154). Operating systems useful in computers configured for reducing translation latency within a MMU using external caching structures according to embodiments of the present invention include UNIX™, Linux™, Microsoft Windows™, AIX™, IBM's i OS™, and others as will occur to those of skill in the art. The operating system (154) in the example of FIG. 1 is shown in RAM (168), but many components of such software typically are stored in non-volatile memory also, such as, for example, on a disk drive (170).

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of data storage (170). Disk drive adapters useful in computers configured for reducing translation latency within a MMU using external caching structures according to embodiments of the present invention include Integrated Drive Electronics (IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for reducing translation latency within a MMU using external caching structures according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
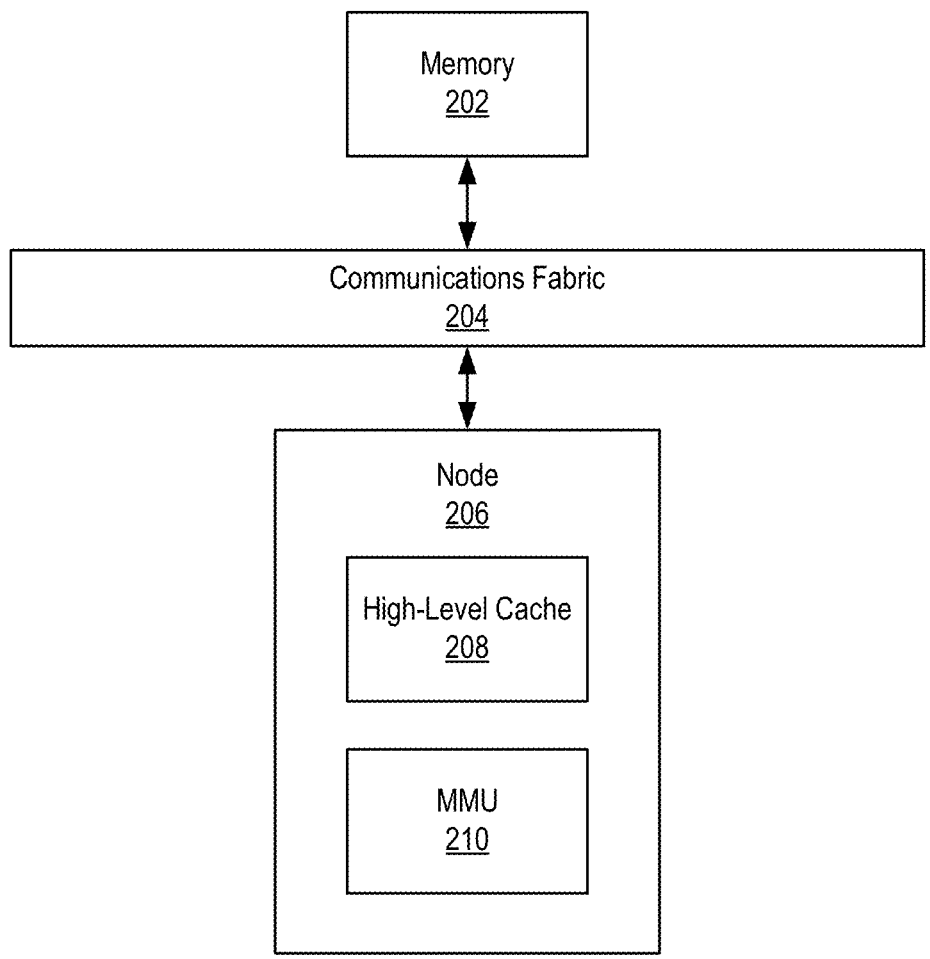
FIG. 2 sets forth a block diagram of an example system configured for reducing translation latency within a MMU using external caching structures according to embodiments of the present invention.

For further explanation, FIG. 2 sets forth an example block diagram of a system configured for reducing translation latency within a MMU using external caching structures according to embodiments of the present invention. As shown in FIG. 2, the system includes memory (202) coupled to a node (206) via a communications fabric (204). The node (206) includes a high-level cache (208) and a MMU (210). Some or all of the elements shown in the system of FIG. 2 may exist within a processor or coupled to a processor, such as processor (156) as described in FIG. 1.

The memory (202) is data storage within the processor and/or coupled to the processor. The memory loads and stores pages of data from slower data storage on the system, such as non-volatile data storage. In order to manage and track the pages of data, the memory (202) maintains a page table that is stored in memory (202) and/or distributed between data storage elements on the system. The memory (202) may also receive information and messages from the MMU (210), including page table entry (PTE) data requests.

The page table is a collection of page table entries (PTEs) each containing PTE data. The PTE data includes a real or physical address translation for a given effective or virtual address. The PTE data also includes metadata describing the state of the page data referenced by the PTE data. As used herein, the term "referenced by the PTE data" refers to the page of data stored at the real address (when in memory) and targeted using the effective or virtual address of the PTE data.

The PTE data may be received with a source flag. Specifically, the memory fabric may attach, as metadata, a source flag to the PTE data as the memory fabric obtains and transfers the PTE data along the memory fabric. The source flag identifies a source location of the PTE data. Specifically, the source flag identifies a memory location that stores the cachline that includes the PTE data. The memory location may be within memory (202) or elsewhere on the system, such as a local cache, remote cache, memory controller, etc. The source flag may be a memory address or other identifier of the location of the memory storing the PTE data.

The metadata within the PTE data may include a change status. The change status indicates changes made to a page referenced by the PTE data. Specifically, the change status may be an indicator, such as a bit or group of bits, that communicates whether a cached copy of the data on the page has been written to or not. In accessing the PTE data, the MMU (210) may determine that the change status must be updated. For example, the MMU (210) may update the change status if the translation request that triggered the table walk is a write request, and the change status of the received PTE data indicates that there is no change to the page referenced by the PTE data, then the MMU (21) may determine that the change status must be updated.

If the MMU (210) determines that the value of the change status must be updated, the update to the PTE data may to be committed to memory and the PTE data may not be stored in the local high-level-cache. If the MMU (210) determines that the value of the change status need not be updated, the PTE data may then be stored in the local high-level-cache (208) if the other requirements for storing the PTE data in the local high-level cache (208) (e.g., source flag requirements) are met.

The node (206) is a collection of related computing elements. The node (206) may be on the processor or coupled to the processor, and may be one of a group of nodes that make up a processor. Each node may include elements not shown in FIG. 2, such as processing cores and low-level caches.

The high-level cache (208) is memory within, or local to, the node (206). The high-level cache (208) is also local to the MMU (210). The high-level cache (208) may be used to store previously accessed cachelines from other memory on the system, such as memory (202). Further, the high-level cache (208) may be used by other elements on the node (206), such as processing cores. The high-level cache (208) may include an embedded dynamic random access memory (eDRAM).

The local high-level cache (208) may be a multi-purpose high-level cache, such as an L3 cache on the node (206). Different elements on the node (206) or otherwise local to the high-level cache (208) may use the high-level cache (208) to store recently accessed cachelines. Therefore, different cachelines stored in the high-level cache may be utilized by elements other than the MMU, such as processing cores on the node (206).

The MMU (210) is logic within the processor that translates one memory address (e.g., an effective address or virtual address) into another (e.g., into a real address or physical address). The MMU (210) performs table walks or other procedures to obtain a translation for a given address, and may store previously used translations in lookaside buffers.

The MMU (210) may be one unit of a distributed MMU on a group of nodes. A distributed MMU is a collection of logical units each providing MMU translation services to elements on the system. Each node may include one or more MMU units that provide low-latency translation services to other elements on the node.

During the address translation page table walk, the MMU (210) reads and updates many blocks of data, both in the lookaside buffers and the page table. Each pass through the table walk sequence may re-access the same data. The latency may be improved by placing some of the accessed data in a nearby cache, such as the high-level cache (208). To that end, the MMU (210) may perform a lateral cast out during the table walk sequence.

The lateral cast out process may begin by reading in or requesting PTE data and requesting coherent ownership of the cacheline containing the PTE data. Coherent ownership of the PTE data is a grant of management over the cacheline containing the PTE data. Specifically, coherent ownership is an exclusive or semi-exclusive ability to store, or to store and change, a cacheline. Because many copies of the cacheline containing the PTE data may exist across the system, a change made to one copy may interfere with a change made to another copy. Coherent ownership grants one process or logic, such as the MMU (210), an exclusive or semi-exclusive ability to store, or to store and change, the cacheline containing the PTE data. A cache directory may track the current coherent owner of the cacheline containing the PTE data.

For example, the MMU (210) may request coherent ownership of the cacheline containing the PTE. The cacheline may be stored in remote cache on a different node and another process may have coherent ownership of the cacheline. The MMU (210) may send a message on a memory interface bus instructing any coherent owners of the cacheline to relinquish coherent ownership of the cacheline. The other process may then relinquish ownership to the MMU (210). The other process may also evict the cacheline from the remote cache. The cache directory may then record the MMU (210) as the new coherent owner of the cacheline.

Once coherent ownership of the PTE data is obtained, and the PTE data is retrieved, the PTE data is returned with a source flag and change status. If the data did not come from a local cache and the change status does not require updating, then the PTE data is placed into the local high-level cache using a lateral cast out. The high-level cache accepts the lateral cast out, and writes the data into the high-level cache. This PTE data is available from the local high-level cache for subsequent table-walk sequences to read. The lateral cast out process occurs in parallel to the reading of additional PTE data for the table walk sequence and does not impede other translations while the cacheline is installed in a local high-level cache.

Figure 3:
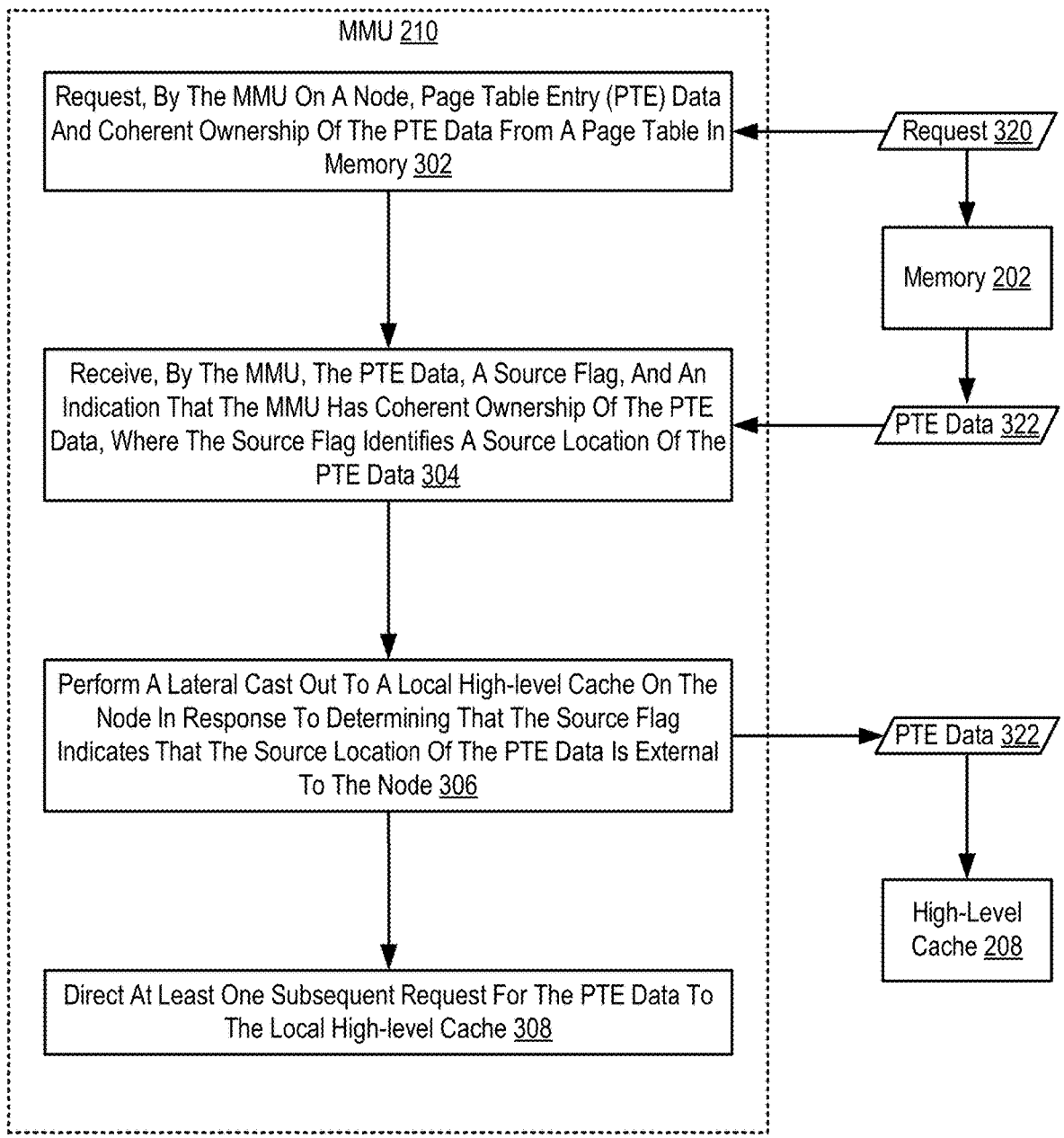
FIG. 3 sets forth a flow chart illustrating an exemplary method for reducing translation latency within a MMU using external caching structures according to embodiments of the present invention.

For further explanation, FIG. 3 sets forth a flow chart illustrating an exemplary method for reducing translation latency within a MMU using external caching structures according to embodiments of the present invention that includes requesting (302), by the MMU (210) on a node, page table entry (PTE) data (322) and coherent ownership of the PTE data (322) from a page table in memory (202). Requesting (302), by the MMU (210) on a node, page table entry (PTE) data (322) and coherent ownership of the PTE data (322) from a page table in memory (202) may be carried out by the MMU (210) reading in a cacheline from memory that includes the PTE data (322). The PTE data (322) may be for a translation that was not stored in a lookaside buffer as part of a table walk sequence.

In order to obtain coherent ownership of the cacheline containing the PTE data (322), the MMU (210) may place a request (320) on the memory interface bus to obtain exclusive coherent ownership of the cacheline containing the PTE data (322). Coherent ownership of the cacheline containing the PTE data (322) allows the MMU (210) to store the cacheline in a high-level cache (208) local to the MMU (210).

The method of FIG. 3 further includes receiving (304), by the MMU (210), the PTE data (322), a source flag, and an indication that the MMU (210) has coherent ownership of the PTE data, wherein the source flag identifies a source location of the PTE data (322). Receiving (304), by the MMU (210), the PTE data (322), a source flag, and an indication that the MMU (210) has coherent ownership of the PTE data, wherein the source flag identifies a source location of the PTE data (322) may be carried out by reading in the cacheline containing the PTE data (322) from a communications fabric. Once the PTE data (322) is received by the MMU (210) the MMU (210) may inspect the source flag. The MMU (210) may also evaluate a change status that indicates changes made to a page referenced by the PTE data.

The method of FIG. 3 further includes performing (306) a lateral cast out to a local high-level cache (208) on the node in response to determining that the source flag indicates that the source location of the PTE data (322) is external to the node. Performing (306) a lateral cast out to a local high-level cache (208) on the node in response to determining that the source flag indicates that the source location of the PTE data (322) is external to the node may be carried out by the MMU (210) or under the direction of the MMU (210).

Determining that the source flag indicates that the source location of the PTE data (322) is external to the node may be carried out by inspecting the source flag and determining whether the source location of the PTE data (322) is local to the MMU (210). The PTE data (322) may have been previously stored in a local cache, such as the local high-level cache. In that case, there is no latency benefit to performing the lateral cast out procedure as the PTE data (322) is accessible at a latency equal or near equal to having the PTE data (322) stored in the local high-level cache (208). If the source flag indicates that the PTE data (322) is not stored in a memory location that is local to the MMU (210) (e.g., a location external to the node containing the MMU (210)), then there may be a latency benefit to performing the lateral cast out to place the PTE data (322) in a local high-level cache (208). Performing (306) a lateral cast out to a local high-level cache (208) on the node may be carried out by storing the cacheline containing the PTE data (322) in the local high-level cache (208), or instructing other memory logic to store the cacheline containing the PTE data (322) in the local high-level cache (208).

The method of FIG. 3 further includes directing (308) at least one subsequent request for the PTE data (322) to the local high-level cache (208). Directing (308) at least one subsequent request for the PTE data (322) to the local high-level cache (208) may be carried out by the MMU (210) or under the direction of the MMU (210). Once the PTE data (322) is placed in the local high-level cache, subsequent attempts to access the PTE data (322) on the node will be redirected by the location in the local high-level cache that stores the cacheline that contains the PTE data (322). The redirection may be automatic based on the memory address used to attempt to access the PTE data (322).

Figure 4:
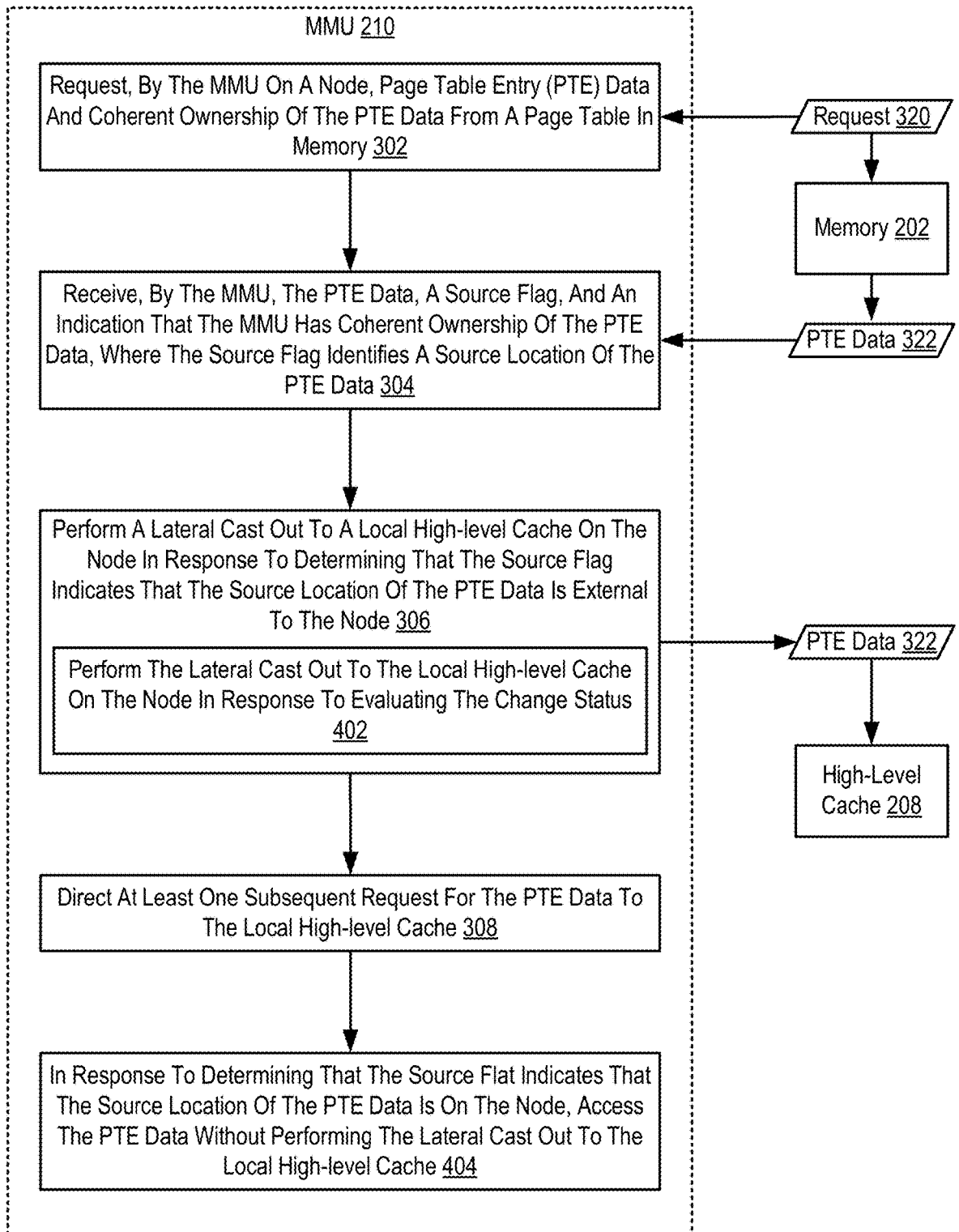
FIG. 4 sets forth a flow chart illustrating an exemplary method for reducing translation latency within a MMU using external caching structures according to embodiments of the present invention.

For further explanation, FIG. 4 sets forth a flow chart illustrating a further exemplary method for reducing translation latency within a MMU using external caching structures according to embodiments of the present invention that includes requesting (302), by the MMU (210) on a node, page table entry (PTE) data (322) and coherent ownership of the PTE data (322) from a page table in memory (202); receiving (304), by the MMU (210), the PTE data (322), a source flag, and an indication that the MMU (210) has coherent ownership of the PTE data, wherein the source flag identifies a source location of the PTE data (322); performing (306) a lateral cast out to a local high-level cache (208) on the node in response to determining that the source flag indicates that the source location of the PTE data (322) is external to the node; and directing (308) at least one subsequent request for the PTE data (322) to the local high-level cache (208).

The method of FIG. 4 differs from the method of FIG. 3, however, in that performing (306) a lateral cast out to a local high-level cache (208) on the node in response to determining that the source flag indicates that the source location of the PTE data (322) is external to the node includes performing (402) the lateral cast out to the local high-level cache (208) on the node in response to evaluating the change status within the PTE data (322). Evaluating the change status within the PTE data (322) may be carried out by reading the change status and determining whether the change status must be updated.

Performing (402) the lateral cast out to the local high-level cache (208) on the node in response to evaluating the change status within the PTE data (322) may be carried out by reading the change status within the PTE data (322) and determining that that change status need not be updated. Performing (402) the lateral cast out to the local high-level cache (208) on the node may be in response to both determining that the source flag indicates that the source location of the PTE data (322) is external to the node and determining that the change status need not be updated (i.e., remain unchanged).

The method of FIG. 4 also differs from the method of FIG. 3, however, in that FIG. 4 further includes in response to determining that the source flag indicates that the source location of the PTE data (322) is on the node, accessing (404) the PTE data (322) without performing the lateral cast out to the local high-level cache (208). Determining that the source flag indicates that the source location of the PTE data (322) is on the node may be carried out by comparing the source flag to addresses stored in the memory on the local node. The source flag may indicate or include a memory address location of the PTE data (322). The MMU (210) may compare that memory address to cachelines stored in the memory local to the MMU (210) such as the local high-level cache. If the source flag matches a cacheline local stored in memory on the node, then that node memory may be the source location of the PTE data (322).

The source flag may be a reference to the location of the memory structure itself, such as the node within which the memory exists. The MMU (210) may compare the source flag to the location of the MMU (210) (such as a node location) to determine if the source flag identifies the local node. Accessing (404) the PTE data (322) without performing the lateral cast out to the local high-level cache (208) may be carried out by the MMU (210) reading the PTE data (322) from the memory location local to the MMU (210).

Figure 5:
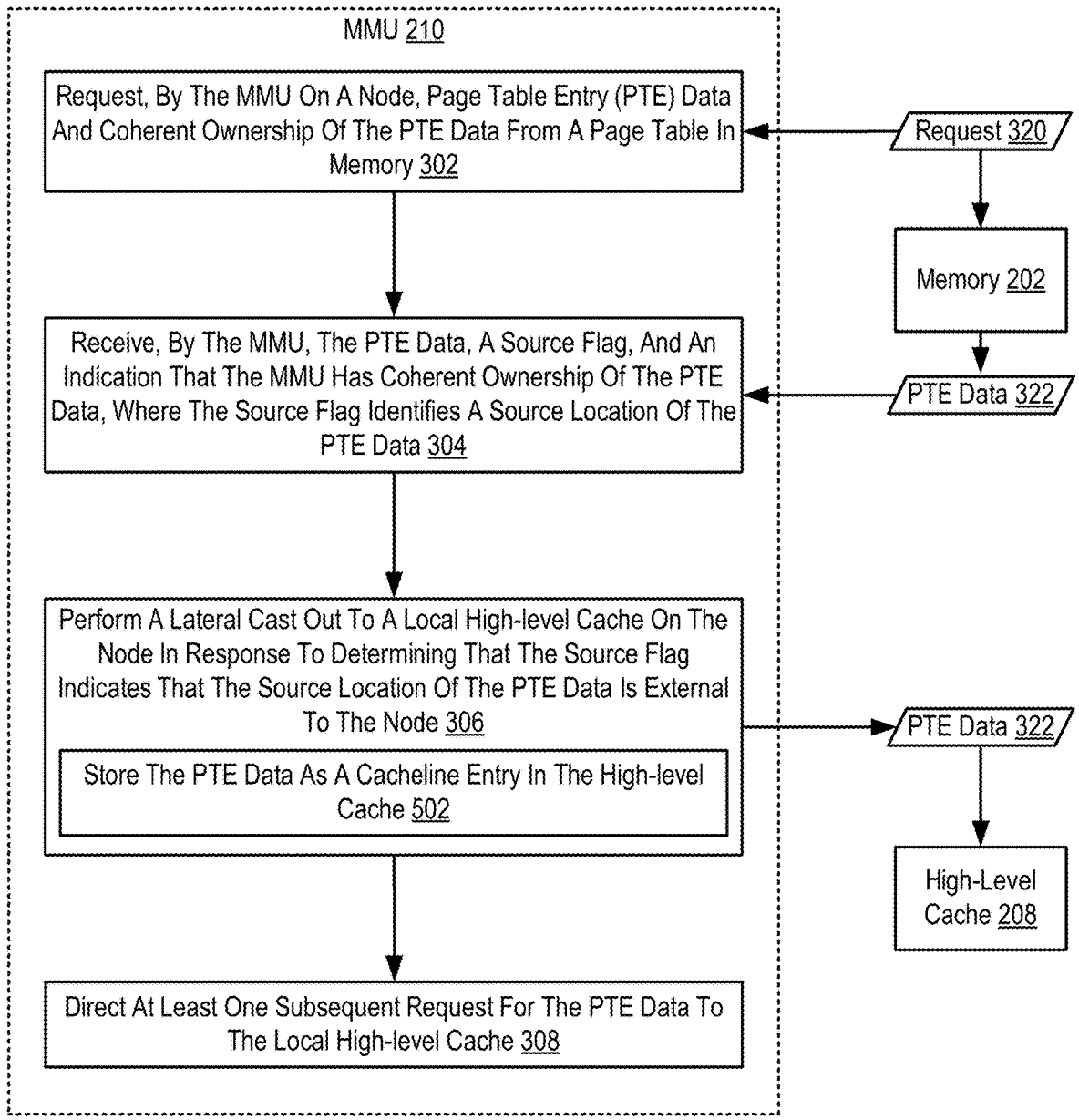
FIG. 5 sets forth a flow chart illustrating an exemplary method for reducing translation latency within a MMU using external caching structures according to embodiments of the present invention.

For further explanation, FIG. 5 sets forth a flow chart illustrating a further exemplary method for reducing translation latency within a MMU using external caching structures according to embodiments of the present invention that includes requesting (302), by the MMU (210) on a node, page table entry (PTE) data (322) and coherent ownership of the PTE data (322) from a page table in memory (202); receiving (304), by the MMU (210), the PTE data (322), a source flag, and an indication that the MMU (210) has coherent ownership of the PTE data, wherein the source flag identifies a source location of the PTE data (322); performing (306) a lateral cast out to a local high-level cache (208) on the node in response to determining that the source flag indicates that the source location of the PTE data (322) is external to the node; and directing (308) at least one subsequent request for the PTE data (322) to the local high-level cache (208).

The method of FIG. 5 differs from the method of FIG. 3, however, in that performing (306) a lateral cast out to a local high-level cache (208) on the node in response to determining that the source flag indicates that the source location of the PTE data (322) is external to the node includes storing (502) the PTE data (322) as a cacheline entry in the high-level cache (208). Storing (502) the PTE data (322) as a cacheline entry in the high-level cache (208) may be carried out by receiving the PTE data (322) from memory as a cacheline, selecting an empty cacheline location in the high-level cache (208) that is available to store the cacheline containing the PTE data (322), and writing the cacheline into the available cacheline location.

In view of the explanations set forth above, readers will recognize that the benefits of reducing translation latency within a MMU using external caching structures according to embodiments of the present invention include:

Improving the operation of a computing system by storing cachelines used by the MMU in memory local to the MMU, reducing latency for table walk procedures and increasing computing system efficiency.

Improving the operation of a computing system by locating cachelines near MMU units that utilize those cachelines more frequently, reducing traffic on the communications fabric and increasing computing system efficiency.

Exemplary embodiments of the present invention are described largely in the context of a fully functional computer system for reducing translation latency within a MMU using external caching structures. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of reducing translation latency within a memory management unit (MMU) using external caching structures, the method comprising:
    requesting, by the MMU on a node, page table entry (PTE) data and coherent ownership of the PTE data from a page table in memory;
    receiving, by the MMU, the PTE data, a source flag, and an indication that the MMU has coherent ownership of the PTE data, wherein the source flag identifies a source location of the PTE data;
    performing, by the MMU, a lateral cast out of the PTE data to a local high-level cache on the node in response to determining that the source flag indicates that the source location of the PTE data is external to the node; and
    directing at least one subsequent request for the PTE data to the local high-level cache.

2. The method of claim 1, further comprising:
    in response to determining that the source flag indicates that the source location of the PTE data is on the node, accessing the PTE data without performing the lateral cast out to the local high-level cache.

3. The method of claim 1, wherein the PTE data comprises a change status indicating changes made to a page referenced by the PTE data, and wherein performing the lateral cast out to the local high-level cache on the node in response to determining that the source flag indicates that the source location of the PTE data is external to the node comprises performing the lateral cast out to the local high-level cache on the node in response to evaluating the change status within the PTE data.

4. The method of claim 1, wherein performing the lateral cast out to the local high-level cache on the node comprises storing the PTE data as a cacheline entry in the high-level cache.

5. The method of claim 1, wherein the MMU is one unit of a distributed MMU on a group of nodes.

6. The method of claim 1, wherein the local high-level cache is shared by at least one processing core on the node.

7. The method of claim 1, wherein the memory is external to the node.

* * * * *